US012655069B2

(12) United States Patent
Read et al.

(10) Patent No.: US 12,655,069 B2
(45) Date of Patent: Jun. 16, 2026

(54) CONTROLLED GRADIENT OF POROSITY IN CMC

(71) Applicant: Raytheon Technologies Corporation, Farmington, CT (US)

(72) Inventors: Kathryn S. Read, Marlborough, CT (US); Brendan M. Lenz, Wethersfield, CT (US)

(73) Assignee: RTX CORPORATION, Farmington, CT (US)

( * ) Notice: Subject to any disclaimer, the term of this patent is extended or adjusted under 35 U.S.C. 154(b) by 496 days.

(21) Appl. No.: 18/083,766

(22) Filed: Dec. 19, 2022

(65) Prior Publication Data

US 2023/0192561 A1 Jun. 22, 2023

Related U.S. Application Data

(60) Provisional application No. 63/265,748, filed on Dec. 20, 2021.

(51) Int. Cl.
*C04B 35/80* (2006.01)
*C04B 35/565* (2006.01)
(Continued)

(52) U.S. Cl.
CPC ............ *C04B 35/80* (2013.01); *C04B 35/565* (2013.01); *C04B 35/62892* (2013.01);
(Continued)

(58) Field of Classification Search
CPC ............ C04B 35/80; C04B 2235/5256; F05D 2300/6033; B32B 18/00
See application file for complete search history.

(56) References Cited

U.S. PATENT DOCUMENTS

| | | | |
|---|---|---|---|
| 3,207,640 A | 9/1965 | Walker | |
| 5,049,329 A | 9/1991 | Allaire et al. | |

(Continued)

FOREIGN PATENT DOCUMENTS

| | | | | |
|---|---|---|---|---|
| CN | 102448910 A | * | 5/2012 | ......... C23C 18/1216 |
| CN | 108779033 A | | 11/2018 | |

(Continued)

OTHER PUBLICATIONS

Machine translation CN102448910 (Year: 2025).*

(Continued)

*Primary Examiner* — Alexandre F Ferre
(74) *Attorney, Agent, or Firm* — Kinney & Lange, P.A.; Nick E Stewart

(57) ABSTRACT

A method for producing a ceramic matrix composite component is disclosed. The method includes providing a plurality of first ceramic fiber plies including a plurality of interconnected tows and a plurality of first pores positioned between adjacent tows. The method includes applying a plurality of first ceramic particles within the plurality of first pores. Next, the method includes applying a plurality of second ceramic fiber plies onto an outer surface of the plurality of first ceramic fiber plies. The second ceramic fiber plies include a plurality of interconnected tows and a plurality of second pores positioned between adjacent tows. The method then includes applying a plurality of second ceramic particles within the plurality of second pores. Further, the plurality of second ceramic particles are larger than the plurality of first ceramic particles. Lastly, the method includes densifying the ceramic matrix composite preform to form the ceramic matrix composite component.

18 Claims, 6 Drawing Sheets

(51) Int. Cl.

| | |
|---|---|
| *C04B 35/628* | (2006.01) |
| *C04B 41/45* | (2006.01) |
| *C04B 41/50* | (2006.01) |
| *C04B 41/87* | (2006.01) |

(52) U.S. Cl.
CPC ........ *C04B 41/457* (2013.01); *C04B 41/5025* (2013.01); *C04B 41/87* (2013.01); *C04B 2235/3826* (2013.01); *C04B 2235/5256* (2013.01); *C04B 2235/5436* (2013.01); *C04B 2235/5472* (2013.01)

(56) References Cited

U.S. PATENT DOCUMENTS

| | | | |
|---|---|---|---|
| 5,250,243 | A | 10/1993 | Allaire et al. |
| 5,459,114 | A | 10/1995 | Kaya et al. |
| 5,547,622 | A | 8/1996 | Chalasani et al. |
| 5,562,788 | A | 10/1996 | Kitson et al. |
| 5,732,748 | A | 3/1998 | Aucagne et al. |
| 5,756,206 | A | 5/1998 | Davies et al. |
| 6,585,842 | B1 | 7/2003 | Bompard et al. |
| 6,641,893 | B1 | 11/2003 | Suresh et al. |
| 7,837,914 | B2 | 11/2010 | Kostar et al. |
| 8,440,045 | B2 | 5/2013 | Bremmer et al. |
| 8,545,938 | B2 | 10/2013 | Schmidt et al. |
| 9,908,305 | B2 | 3/2018 | Chamberlain et al. |
| 10,822,281 | B2 | 11/2020 | She et al. |
| 10,829,418 | B2 | 11/2020 | Jackson et al. |
| 10,954,169 | B2 | 3/2021 | Droz et al. |
| 11,015,467 | B2 | 5/2021 | Read |
| 11,072,565 | B2 | 7/2021 | Weaver et al. |
| 12,017,379 | B2 | 6/2024 | Read et al. |
| 12,312,724 | B2 | 5/2025 | Read et al. |
| 12,330,994 | B2 | 6/2025 | Lenz et al. |
| 12,398,078 | B2 | 8/2025 | Read et al. |
| 2002/0022422 | A1 | 2/2002 | Waldrop, III et al. |
| 2002/0084558 | A1 | 7/2002 | Hanzawa et al. |
| 2002/0141632 | A1 | 10/2002 | Engelbart et al. |
| 2005/0164578 | A1 | 7/2005 | Aldridge et al. |
| 2007/0096371 | A1 | 5/2007 | Mcguigan et al. |
| 2007/0099527 | A1 | 5/2007 | Brun et al. |
| 2007/0204555 | A1 | 9/2007 | Engelbart et al. |
| 2010/0119777 | A1 | 5/2010 | Merrill et al. |
| 2012/0074265 | A1 | 3/2012 | Hallander et al. |
| 2012/0237707 | A1 | 9/2012 | Beraud et al. |
| 2012/0301691 | A1 | 11/2012 | Charleux et al. |
| 2014/0099484 | A1 | 4/2014 | Roberts et al. |
| 2016/0136925 | A1* | 5/2016 | Chamberlain .... C04B 35/62844 428/113 |
| 2016/0186691 | A1 | 6/2016 | Charleux et al. |
| 2017/0015595 | A1 | 1/2017 | Weaver et al. |
| 2017/0348876 | A1 | 12/2017 | Lin et al. |
| 2018/0281228 | A1 | 10/2018 | Godon et al. |
| 2019/0048730 | A1 | 2/2019 | Subramanian et al. |
| 2019/0359531 | A1 | 11/2019 | Steffier et al. |
| 2019/0389171 | A1 | 12/2019 | Nelson |
| 2020/0078822 | A1 | 3/2020 | Khattab et al. |
| 2020/0385898 | A1 | 12/2020 | Chiu et al. |
| 2021/0239008 | A1 | 8/2021 | Read |
| 2021/0262353 | A1 | 8/2021 | Mccaffrey et al. |
| 2022/0388913 | A1 | 12/2022 | Read et al. |
| 2023/0036697 | A1 | 2/2023 | Lenz et al. |
| 2023/0191656 | A1 | 6/2023 | Read et al. |
| 2023/0192561 | A1 | 6/2023 | Read et al. |
| 2023/0407532 | A1 | 12/2023 | Lenz |
| 2024/0116828 | A1 | 4/2024 | Jarmon |

FOREIGN PATENT DOCUMENTS

| | | |
|---|---|---|
| CN | 111058187 A | 4/2020 |
| CN | 111132954 A | 5/2020 |
| DE | 102015209535 A1 | 11/2016 |
| EP | 0302449 A2 | 2/1989 |
| EP | 0589286 A1 | 3/1994 |
| EP | 1215183 A1 | 6/2002 |
| EP | 3590906 A1 | 1/2020 |
| EP | 3650424 A1 | 5/2020 |
| EP | 4098637 A1 | 12/2022 |
| EP | 4119709 A1 | 1/2023 |
| GB | 2252315 A | 8/1992 |
| JP | 2000096387 A | 4/2000 |
| JP | 2005290204 A | 10/2005 |
| JP | 2007332484 A | 12/2007 |
| WO | 9412708 A1 | 6/1994 |
| WO | 9502081 A1 | 1/1995 |
| WO | 2010061139 A2 | 6/2010 |
| WO | 2014151066 A1 | 9/2014 |
| WO | 2016046788 A1 | 3/2016 |
| WO | 2020209848 A1 | 10/2020 |
| WO | 2021005282 A2 | 1/2021 |

OTHER PUBLICATIONS

Extended European Search Report for EP Application No. 22192952.4, Dated Feb. 3, 2023, p. 8.

Extended European Search Report for EP Application No. 22205639.2, dated Mar. 24, 2023, 7 pages.

International Preliminary Report on Patentability for PCT Application No. PCT/US2022/053178, Dated Jun. 20, 2024, p. 5.

International Search Report and Written Opinion for PCT Application No. PCT/US2022/053178, Dated May 2, 2023, p. 9.

First Communication Pursuant to Article 94(3) EPC for EP Application No. 22192952.4, Dated Dec. 18, 2024, p. 7.

First Communication Pursuant to Article 94(3) EPC for EP Application No. 22205639.2, Dated Jan. 10, 2025, p. 3.

First Communication Pursuant to Article 94(3) EPC for EP Application No. 22212559.3, Dated Jan. 10, 2025, p. 6.

Extended European Search Report for EP Application No. 22212614.6, Dated Oct. 2, 2023, p. 13.

Extended European Search Report for EP Application No. 22212549.4, Dated Jun. 7, 2023, p. 13.

Extended European Search Report for EP Application No. 22212559.3, May 10, 2023, p. 8.

Partial European Search Report for EP Application No. 22212614.6, Dated Jun. 30, 2023, p. 14.

http://www.mschangart.com/studio-art-honors/ceramic-bowl (Year: 2014).

https ://www.sciencedirect.com/science/article/pii/S0263822315000914#f0005 (Year: 2015).

* cited by examiner

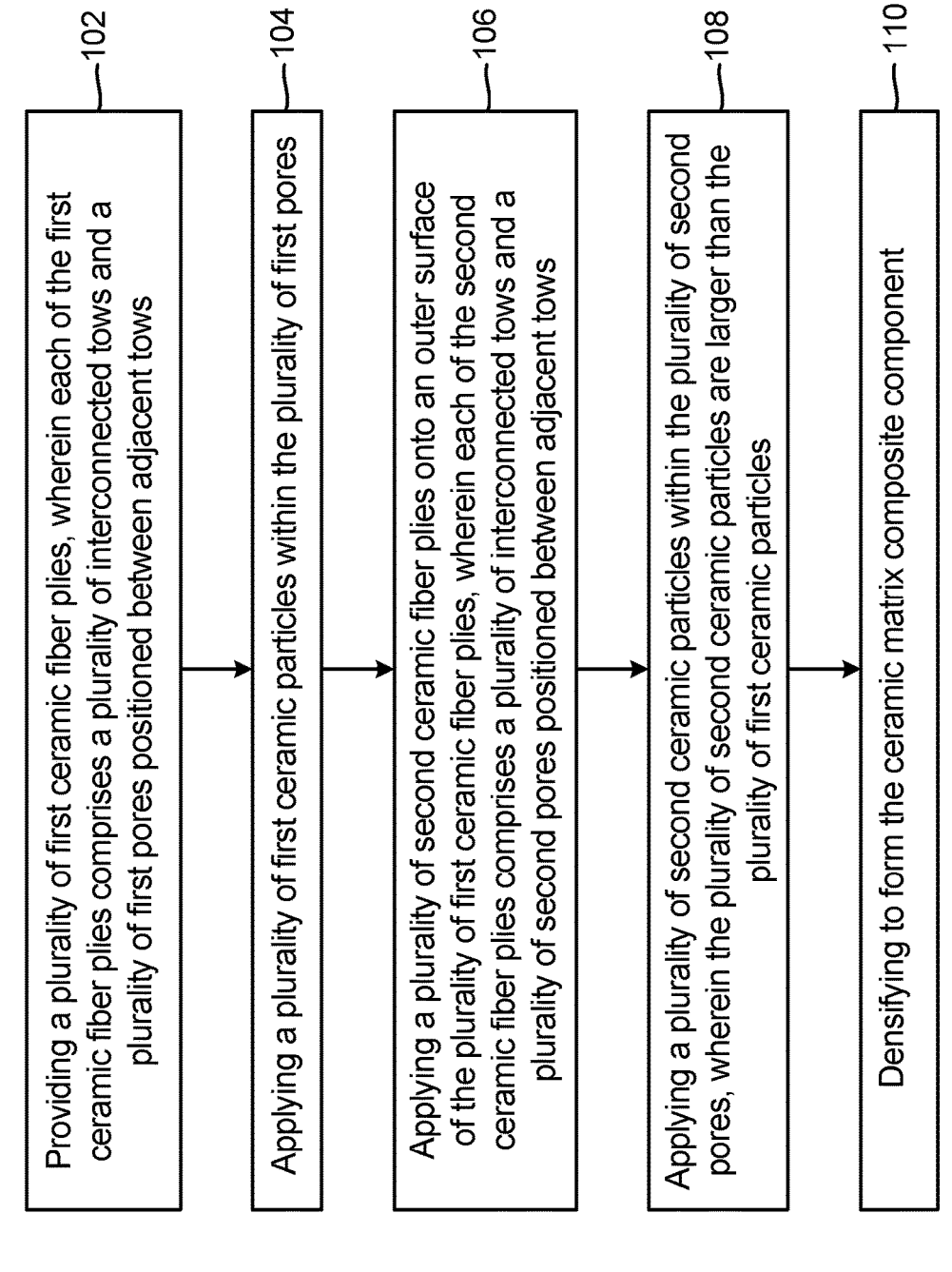

Providing a plurality of first ceramic fiber plies, wherein each of the first ceramic fiber plies comprises a plurality of interconnected tows and a plurality of first pores positioned between adjacent tows ⌐102

Applying a plurality of first ceramic particles within the plurality of first pores ⌐104

Applying a plurality of second ceramic fiber plies onto an outer surface of the plurality of first ceramic fiber plies, wherein each of the second ceramic fiber plies comprises a plurality of interconnected tows and a plurality of second pores positioned between adjacent tows ⌐106

Applying a plurality of second ceramic particles within the plurality of second pores, wherein the plurality of second ceramic particles are larger than the plurality of first ceramic particles ⌐108

Densifying to form the ceramic matrix composite component ⌐110

Fig. 3A

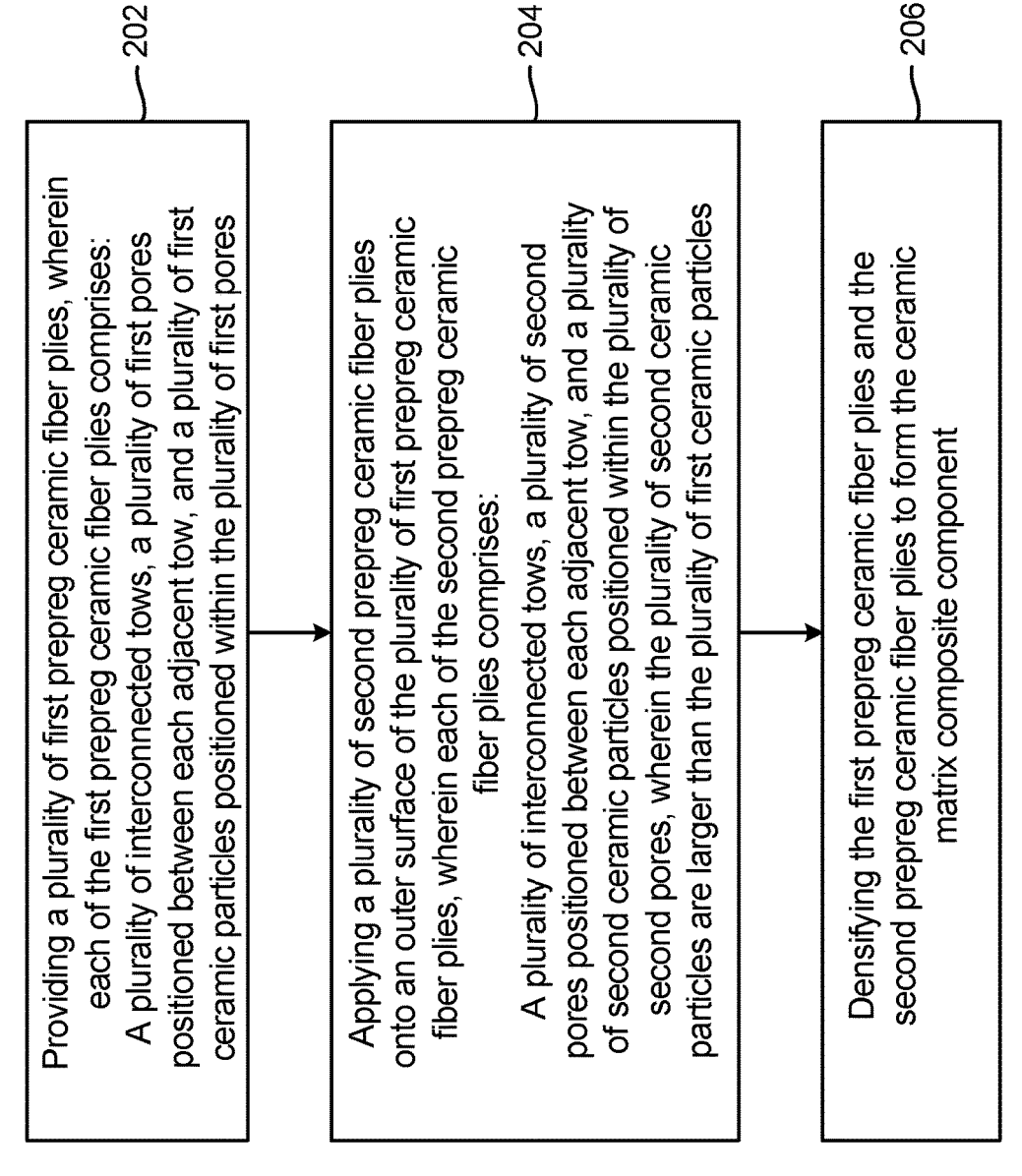

200

202

Providing a plurality of first prepreg ceramic fiber plies, wherein each of the first prepreg ceramic fiber plies comprises:
A plurality of interconnected tows, a plurality of first pores positioned between each adjacent tow, and a plurality of first ceramic particles positioned within the plurality of first pores

204

Applying a plurality of second prepreg ceramic fiber plies onto an outer surface of the plurality of first prepreg ceramic fiber plies, wherein each of the second prepreg ceramic fiber plies comprises:

A plurality of interconnected tows, a plurality of second pores positioned between each adjacent tow, and a plurality of second ceramic particles positioned within the plurality of second pores, wherein the plurality of second ceramic particles are larger than the plurality of first ceramic particles

206

Densifying the first prepreg ceramic fiber plies and the second prepreg ceramic fiber plies to form the ceramic matrix composite component

Fig. 3B

CONTROLLED GRADIENT OF POROSITY IN CMC

CROSS-REFERENCE TO RELATED APPLICATION(S)

This application claims the benefit of U.S. Provisional Application No. 63/265,748 filed Dec. 20, 2021, for "CONTROLLED GRADIENT OF POROSITY IN CMC" is hereby incorporated by reference in its entirety.

BACKGROUND

The present invention relates to the fabrication of ceramic matrix composites and, more particularly, to a ceramic matrix composite having improved properties for operating in gas turbine engines.

Ceramic matrix composites are desirable for use in gas turbine engines due to their unique material properties including high temperature and oxidation resistance capabilities, high strength and creep resistance, high thermal conductivity, and low weight. During production of the ceramic matrix composite components, pores are created between adjacent tows of the ceramic matrix composite component due to the weave pattern and the cross-sectional shape of each individual tow. The size and location of the pores can affect the performance characteristics of the ceramic matrix composite component during operation of the gas turbine engine. Therefore, controlling the size and location of the pores is critical for enabling a wider range of design solutions for gas turbine engine components.

SUMMARY

According to one aspect of the disclosure, a method for producing a ceramic matrix composite component is disclosed. The method includes the following steps. Providing a plurality of first ceramic fiber plies, wherein each of the first ceramic fiber plies comprises a plurality of first interconnected tows defining a plurality of first pores between adjacent of the plurality of first interconnected tows. Applying a plurality of first ceramic particles within the plurality of first pores. Applying a plurality of second ceramic fiber plies onto an outer surface of the plurality of first ceramic fiber plies, wherein each of the second ceramic fiber plies comprises a plurality of second interconnected tows defining a plurality of second pores between adjacent of the plurality of second interconnected tows. Applying a plurality of second ceramic particles within the plurality of second pores. Densifying to form the ceramic matrix composite component, wherein before densification a planar porosity of the plurality of first ceramic fiber plies with the applied plurality of first ceramic particles is lower than a planar porosity of the plurality of second ceramic fiber plies with the applied plurality of second ceramic particles.

According to another aspect of the disclosure, a ceramic matrix composite preform includes a plurality of ceramic fiber plies, a first zone, a second zone, a plurality of first ceramic particles, and a plurality of second ceramic particles. Each of the ceramic fiber plies comprises a plurality of interconnected tows. The first zone includes at least one of the ceramic fiber plies and a plurality of first pores positioned between adjacent tows within the first zone, wherein the plurality of first pores have a first average pore size. The second zone includes at least one of the ceramic fiber plies and a plurality of second pores positioned between adjacent tows within the second zone, wherein the plurality of second pores have a second average pore size. The plurality of first ceramic particles are positioned within the plurality of first pores of the first zone. The plurality of second ceramic particles are positioned within the plurality of second pores of the second zone. A planar porosity of the first zone with the plurality of first ceramic particles positioned within the plurality of first pores is lower than a planar porosity of the second zone with the plurality of second ceramic particles positioned within the plurality of second pores.

BRIEF DESCRIPTION OF THE DRAWINGS

FIG. 3A is a flow chart illustrating steps of a first method for producing ceramic matrix composites.

FIG. 3B is a flow chart illustrating steps of a first method for producing ceramic matrix composites.

DETAILED DESCRIPTION

This disclosure presents a method for producing ceramic matrix composites (CMCs), and resulting CMC components. The method can include fabricating a preform with at least two differentiated zones of woven plies of different average pore sizes and filling these different average pore sizes with at least two different particle size distributions and/or weight percentages. The method can also include fabricating a preform with at least two differentiated zones of woven plies of different average pore sizes and filling these different average pores sizes with constant sized particles and/or weight percentages. The method can also include fabricating a preform with woven plies having constant average pores sizes and filling the pores with particles having constant or varying particle sizes. The method for producing CMCs creates CMCs having an optimized pore structure and a more uniform densification of the CMCs.

Figures 1A, 1B:
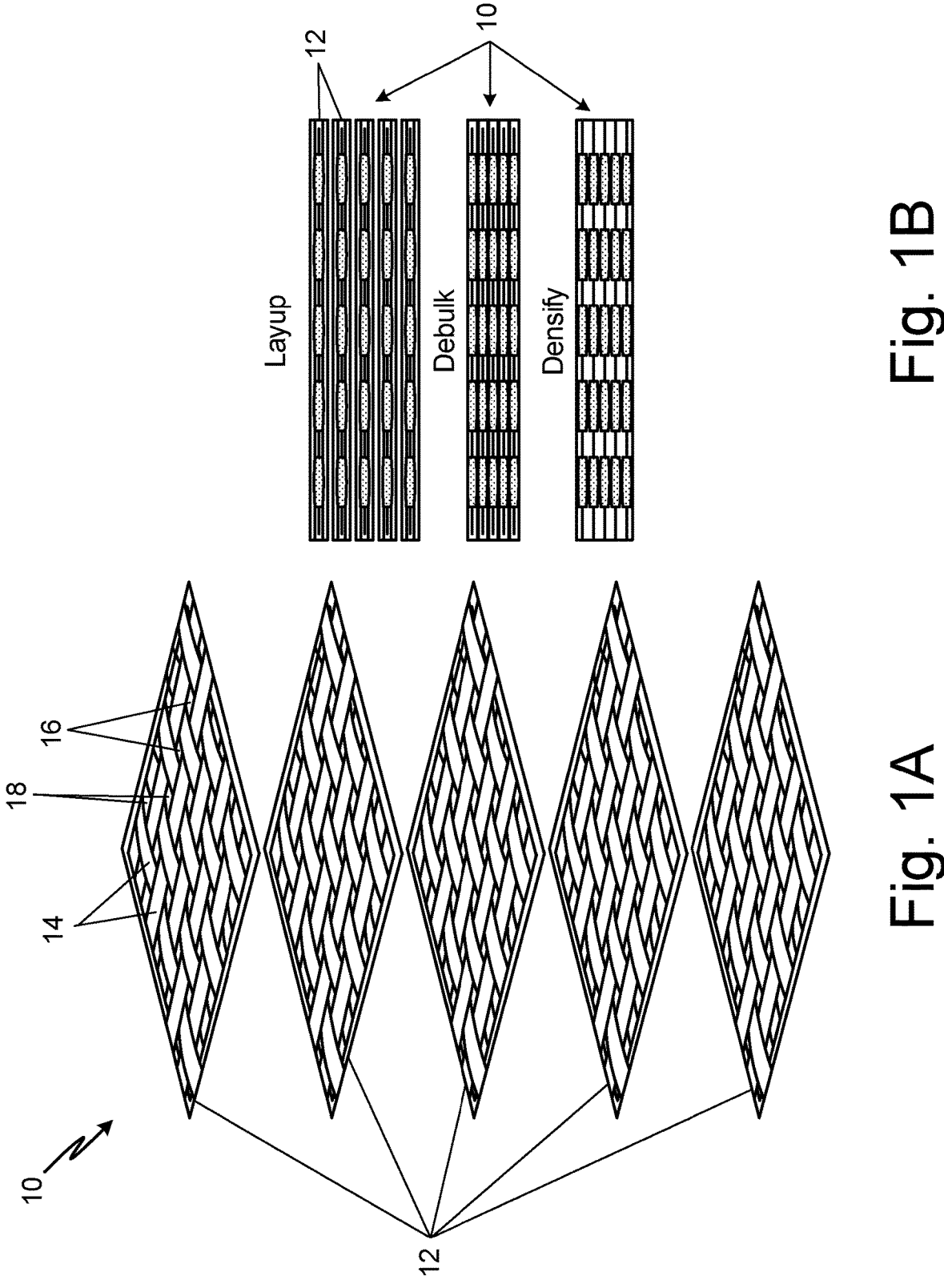
FIG. 1A is an exploded perspective view of a simplified ceramic matrix composite including multiple plies.
FIG. 1B is a cross-sectional view of an example ceramic matrix composite layup across multiple process stages.
Figure 1C:
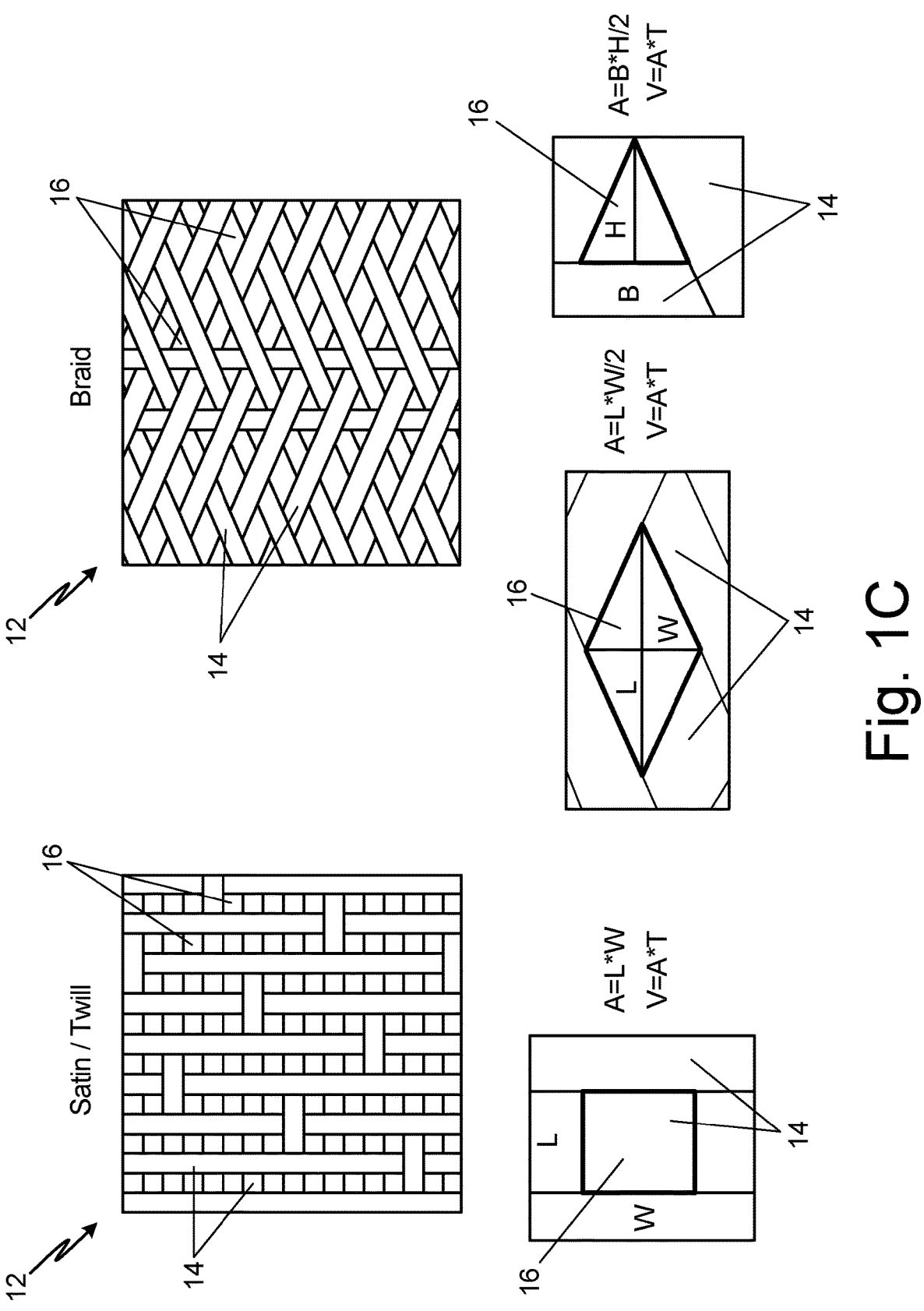
FIG. 1C is a close-up view of a ply of the ceramic matrix composite illustrating example pore shapes and sizes.

FIG. 1A is a perspective view of ceramic matrix composite 10 including multiple plies 12. FIG. 1B is a cross-sectional view of ceramic matrix composite 10 across multiple process stages. FIG. 1C is a close-up view of ply 12 of ceramic matrix composite 10 illustrating interconnected tows 14 and the shapes and sizes of pores 16. FIGS. 1A-1C will be discussed together. Ceramic matrix composite 10 will hereinafter be referred to as CMC 10. As shown in FIGS. 1A-1B, CMC 10 can be constructed from one or more plies 12 arranged in a desired manner. As used herein, the term "ply" can be interchangeable with terms such as "sheet" and "fabric". Plies 12 can be formed from braided, two-dimensional woven, three-dimensional woven, and/or non-woven ceramic fibers or tows 14, which in an exemplary embodiment, can be formed from silicon carbide. Other suitable ceramics are contemplated herein. Further, in an exemplary embodiment, each tow 14 has a width of about one millimeter. Plies 12 can further be formed from unidirectional and/or multidirectional (including randomly oriented) fibers or tows 14. For a given CMC 10 formed from multiple plies 12, plies 12 can, but need not be uniform in their design (e.g., composition, thickness, shape, etc.). Pores 16 are the spaces or gaps that are positioned between adjacent tows 14 of CMC 10, discussed below. In the embodiment shown in FIG. 1A, CMC 10 includes five plies 12 that are stacked, debulked, and densified to produce the resulting CMC 10. In another embodiment, CMC 10 can include more or less than five plies 12 that are stacked, debulked, and densified to produce the resulting CMC 10, discussed below. Further, CMC 10 can be a net shape or near-net shape and be a two or three-dimensional structure.

In one example, once an individual ply 12 of CMC 10 is formed, ceramic particles 18 can be selectively applied to pores 16 between individual tows 14 of ply 12 through methods such as spray applications and slurry infiltration through a bath or localized injection. In other examples, ply 12 can be a pre-preg cloth that was previously impregnated with ceramic particles 18 within pores 16 between adjacent tows 14. Suitable ceramic particles 18 can be formed from silicon carbide, boron carbide, hafnium oxide, hafnium boride, aluminum oxide, ytterbium oxide, or zirconium boride, to name a few non-limiting examples. Ceramic particles 18 can be a homogeneous or heterogenous mixture of generally spherical, elongate, or otherwise irregularly shaped particles (e.g., short ceramic fibers). In one embodiment, ceramic particles 18 can range in size from 10 micrometers to 100 micrometers, depending on the size of tows 14 used to construct ply 12, among other variables. In another embodiment, ceramic particles 18 can range in size from 40 micrometers to 70 micrometers.

The size and loading level of ceramic particles 18 used can vary depending on the size of pore 16 and the location of each individual ply 12 within CMC 10. For example, a smaller sized ceramic particle 18 can be used to fill a small pore 16 within ply 12 positioned in the center (the third ply 12) of a stack of five plies 12. Additionally, a larger sized ceramic particle 18 can be used to fill a larger pore 16 within an outer (top or bottom) ply 12 of a stack of five plies 12. The size and loading level of ceramic particles 18 can be selectively chosen and applied to specific pores 16 of CMC 10 to achieve the desired mechanical and thermal properties. In exemplary embodiments, smaller sized ceramic particles 18 may generally be more desirable at or near the central layers of CMC 10 since they have greater surface area and create smaller channels for gas flow when loaded at the same weight percentage in a given ply 12. The size and loading levels of ceramic particles 18 within plies 12 of CMC 10 will be discussed in detail with reference to FIGS. 2A-2C. In any embodiment, application of ceramic particles 18 in pores 16 between adjacent tows 14 of ply 12 can occur in one or multiple successive iterations to achieve the desired result.

After selectively applying ceramic particles 18 to pores 16 to each ply 12, the individual plies 12 are stacked on top of each other and compressed to debulk CMC 10 and remove voids/spaces between individual plies 12 of CMC 10. Once debulked, CMC 10 can undergo matrix formation and densification using a chemical vapor infiltration or deposition (CVI or CVD) process. During densification, plies 12 are infiltrated by reactant vapors, and a matrix material is formed. The matrix material can be a silicon carbide or other suitable ceramic material. Densification is carried out until the resulting CMC 10 has reached the desired residual porosity. In alternative embodiments, densification can include other methodologies including but not limited to melt infiltration and/or polymer infiltration and pyrolysis. The resulting CMC 10 components have desirable mechanical and thermal properties for harsh operating environments like the hot section of a gas turbine engine. Other aerospace applications include exhaust systems, ducting, shrouds, vanes, blades, and sealing systems. The disclosed method can also be used to produce CMC 10 components for maritime, power generation, and industrial applications.

As shown best in FIG. 1C, pores 16 are the spaces or gaps between adjacent tows 14 of each ply 12 of CMC 10. Pores 16 can have various shapes and sizes depending on the shape of tows 14 and the weave or pattern in which tows 14 are interconnected. In one example, tows 14 are interconnected through a satin/twill weave and the resulting pores 16 have a generally square or rectangular cross-section. In this example, the area of an individual pore 16 can be determined by multiplying the width and the length of pore 16; and the volume of pore 16 can be determined by multiplying the area of pore 16 by the thickness of ply 12. In another example, tows 14 are interconnected through a braid pattern and the resulting pores 16 have a generally rhombus or triangular cross-section. In this example, the area of the rhombus shaped pore 16 can be determined by multiplying the diagonal width and the diagonal length of pore 16 and then dividing by two. The volume of rhombus shaped pore 16 can be determined by multiplying the area of pore 16 by the thickness of ply 12. Further, the area of the triangular shaped pore 16 can be determined by multiplying the base width and the vertical height (perpendicular to the base) of pore 16 and then dividing by two. The volume of the triangular shaped pore 16 can be determined by multiplying the area of pore 16 by the thickness of ply 12. In any case, the area and/or volume of pore 16 having any shape can be determined and an average pore size can be determined for pores 16 of each ply 12 of CMC 10, discussed below.

Figure 2A:
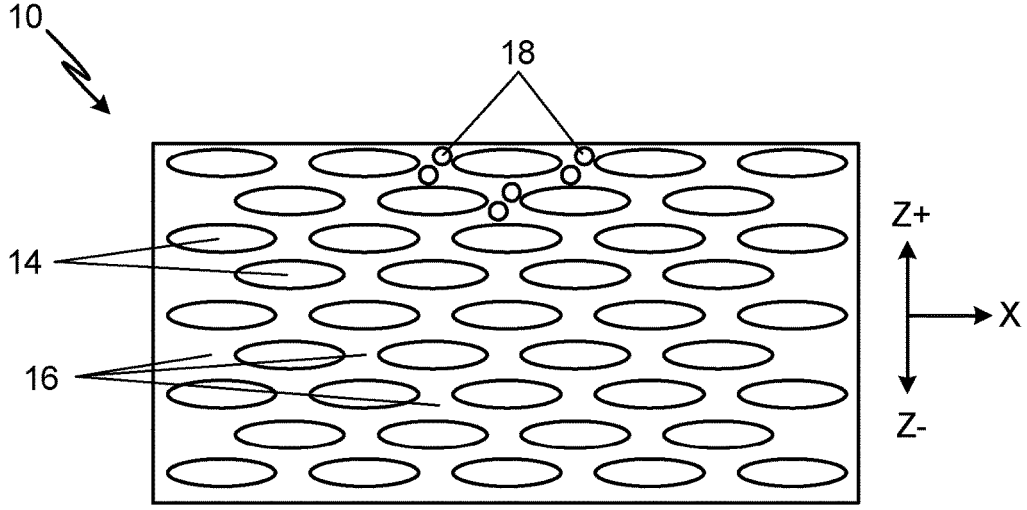
FIG. 2A is a simplified cross-sectional view of a ceramic matrix composite having a uniform microstructure.

FIG. 2A is a side cross-sectional view of CMC 10 with a uniform microstructure. As shown in FIG. 2A, in some examples, CMC 10 can include a plurality of tows 14 that have a generally uniform microstructure throughout CMC 10. In other words, tows 14 of CMC 10 can be arranged in a generally constant manner in the height (z-direction), width (x-direction), and length (in/out of the page) of CMC 10. CMC 10 including a generally uniform microstructure includes tows 14 that are equally spaced and follow a repeating positional pattern through each ply 12 of CMC 10. Further, CMC 10 including a generally uniform microstructure includes pores 16 that are equally spaced and follow a repeating positional pattern through each ply 12 of CMC 10. In examples in which CMC 10 includes a generally uniform microstructure, the addition of ceramic particles 18 and the densification process can result in canning off and less than desirable mechanical and thermal properties of CMC 10. Canning off is an issue that can be encountered during the densification of CMC 10. When CMC 10 is infiltrated with reactant vapors and a matrix material is formed, densification at or near the surface of CMC 10 can occur faster than near the central plies 12 of CMC 10. This can cause the outer plies 12 of CMC 10 to densify and seal off the central plies 12 of CMC 10, preventing the central plies 12 from encountering the reactant vapors and fully densifying, thus causing a reduction in mechanical and thermal properties of CMC 10. As such, CMC 10 including a uniform microstructure can cause a reduction in mechanical and thermal properties in some scenarios.

Figure 2B:
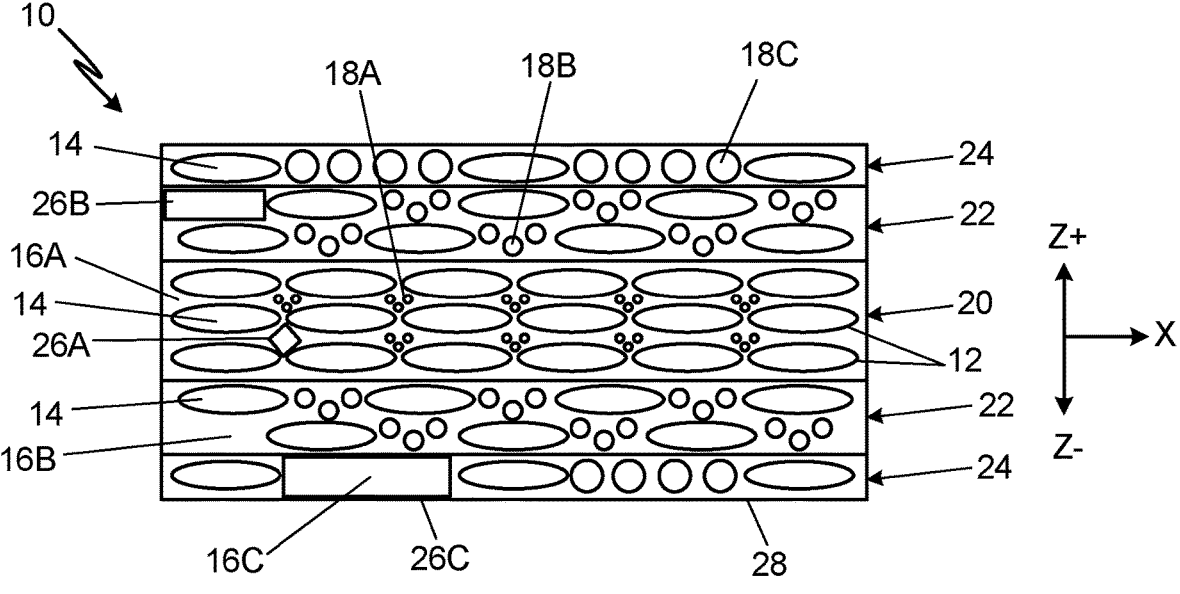
FIG. 2B is a simplified cross-sectional view of a ceramic matrix composite having a gradient microstructure.

FIG. 2B is a side cross-sectional view of CMC 10 with a gradient microstructure, i.e., a microstructure with gradient material density. CMC 10 is fabricated such that there is variable porosity content and/or open space through the thickness (2-direction) of CMC 10. In some examples, CMC 10 can be intentionally fabricated to include the variable/gradient porosity through the thickness of CMC 10. In other examples, variable/gradient porosity will be present in CMC 10 based on the geometry of the part to be fabricated from CMC 10. In either example, variable/gradient porosity means the size of pores 16 will vary or change depending on the location within CMC 10. In other words, CMC 10 with a gradient microstructure has a varying density (synonymous with varying pore size/porosity) through the thickness of CMC 10, such that the density within a mid-plane of CMC 10 may be greater than a density near outer surface 28 of CMC 10. The varying density through the thickness of CMC 10 (before densification of the applied ceramic particles 18) facilitates a more uniform density of CMC 10 after densification of CMC 10, as compared to a uniform microstructure, discussed below. Further, the varying density of CMC 10 allows reactant vapors to easily travel through the outer plies 12 of CMC 10 to the inner plies 12 of CMC, discussed in detail below.

The weave architecture of CMC 10 results in each ply 12 of CMC 10 having a planar porosity. In some examples, the planar porosity of a single ply 12 may be the same as the planar porosity of an adjacent ply 12. In other examples, the planar porosity of a single ply 12 may differ from the planar porosity of an adjacent ply 12. Planar porosity is the percentage of pore area relative to the total area of the ceramic fabric measured within a plane intersecting the ceramic fabric (as shown in FIG. 1C). Planar porosity within a ply 12 (or zone of plies 12) can be determined within a plane intersecting the ply 12 (or zone of plies) generally parallel to a longitudinal direction of tows within at least a portion of the ply (i.e., an inspection region). For an individual pore, the planar porosity is equal to the end-to-end tow spacing squared for a given ply divided by the center-to-center tow spacing squared of the ply (as shown in FIG. 1C). The gradient microstructure of CMC 10 results in some zones of CMC 10 having greater planar porosity than other zones of CMC 10. For example, the central plies 12 of CMC 10 may have a greater planar porosity than the outer plies 12 of CMC 10, discussed further below.

CMC 10 includes first zone 20, second zone 22, and third zone 24. Although CMC 10 is described as having three zones for illustrative purposes, it is to be understood that CMC 10 can have more or fewer than three zones and the following description equally applies to examples having more or fewer than three zones.

First zone 20 includes a plurality of ceramic fiber plies 12 that have been stacked, debulked, and densified. As such, first zone 20 includes at least one ceramic fiber ply 12 including a plurality of interconnected tows 14, as previously described. First zone 20 also includes a plurality of first pores 16A that are positioned between adjacent tows 14 within first zone 20. In other words, first pores 16A are the spaces of gaps between adjacent tows 14 within first zone 20 of CMC 10. Tows 14 of first zone 20 have a generally constant weave pattern, such that first pores 16A have a generally constant size within first zone 20 of CMC 10. Further, first pores 16A have a first average pore size 26A, which is the average pore size for all first pores 16A within first zone 20 of CMC 10. First zone 20 also has an XY planar porosity, which is the area fraction of first pores 16A within a particular XY plane of the first zone 20 (the Y-direction is in/out of the page as shown in FIG. 2B). In other words, the planar porosity of an XY plane within first zone 20 is the area of first pores 16A divided by the total area within a particular XY plane of interest. In the example shown, first zone 20 is positioned at a mid-plane of CMC 10, such that first zone 20 is the central portion of CMC 10 furthest from outer surface 28 of CMC 10. In another example, first zone 20 can be positioned at another plane of CMC 10, such as at a point of thickness or a distal end of CMC 10, among other options. In any example, first zone 20 includes first pores 16A that are smaller than pores 16B of second zone 22.

Second zone 22 includes a plurality of ceramic fiber plies 12 that have been stacked, debulked, and densified. As such, second zone 22 includes at least one ceramic fiber ply 12 including a plurality of interconnected tows 14, as previously described. Second zone 22 also includes a plurality of second pores 16B that are positioned between adjacent tows 14 within second zone 22. In other words, second pores 16B are the spaces of gaps between adjacent tows 14 within second zone 22 of CMC 10. Tows 14 of second zone 22 have a generally constant weave pattern, such that second pores 16B have a generally constant size within second zone 22 of CMC 10. Further, second pores 16B have a second average pore size 26B, which is the average pore size for all second pores 16B within second zone 22 of CMC 10. In some examples, the first average pore size 26A within first zone 20 is smaller than the second average pore size 26B within second zone 22. Second zone 22 also has an XY planar porosity, which is the area fraction of second pores 16B within a particular XY plane of the second zone 22 (the Y-direction is in/out of the page as shown in FIG. 2B). In other words, the planar porosity of an XY plane within second zone 22 is the area of second pores 16B divided by the total area within a particular XY plane of interest. In some examples, the XY planar porosity of a plane within first zone 20 is less than the XY planar porosity of a plane within second zone 22. In the example shown, second zone 22 is positioned adjacent first zone 20 of CMC 10 and second zone 22 is positioned in a direction closer to outer surface 28 of CMC 10. In another example, second zone 22 can be positioned at another plane of CMC 10, but in any example second zone 22 will be positioned adjacent first zone 20. Further, in any example, second zone 22 includes second pores 16B that are smaller than pores 16C of third zone 24.

Third zone 24 includes a plurality of ceramic fiber plies 12 that have been stacked, debulked, and densified. As such, third zone 24 includes at least one ceramic fiber ply 12 including a plurality of interconnected tows 14, as previously described. Third zone 24 also includes a plurality of third pores 16C that are positioned between adjacent tows 14 within third zone 24. In other words, third pores 16C are the spaces of gaps between adjacent tows 14 within third zone 24 of CMC 10. Tows 14 of third zone 24 have a generally constant weave pattern, such that third pores 16C have a generally constant size within third zone 24 of CMC 10. Further, third pores 16C have a third average pore size 26C, which is the average pore size for all third pores 16C within third zone 24 of CMC 10. In some examples, the second average pore size 26B within second zone 22 is smaller than the third average pore size 26C within third zone 24. Third zone 24 also has an XY planar porosity, which is the area fraction of third pores 16C within a particular XY plane of the third zone 24 (the Y-direction is in/out of the page as shown in FIG. 2B). In other words, the planar porosity of an XY plane within third zone 24 is the area of third pores 16C divided by the total area within a particular XY plane of interest. In some examples, the XY planar porosity of a plane within second zone 22 is less than the XY planar porosity of a plane within third zone 24. In the example shown, third zone 24 is positioned adjacent second zone 22 of CMC 10 and third zone 24 is positioned adjacent outer surface 28 of CMC 10. In another example, third zone 24 can be positioned at another plane of CMC 10, but in any example third zone 24 will be positioned adjacent second zone 22. Further, in any example, third zone 24 includes third pores 16C that are larger than first pores 16A of first zone 20 and larger than second pores 16B of second zone 22.

As such, CMC 10 with a gradient microstructure includes first zone 20, second zone 22, and third zone 24 with differing first average pore size 26A, second average pore size 26B, and third average pore size 26C. More specifically, first average pore size 26A is the smallest average pore size within CMC 10; second average pore size 26B is larger than first average pore size 26A and smaller than third average pore size 26C within CMC 10; and third average pore size 26C is the largest average pore size within CMC 10. Therefore, in the example shown, the average pore size between adjacent tows 14 of CMC 10 gradually increases from the mid-plane of CMC 10 toward outer surface 28 of CMC 10. Likewise, the planar porosity between adjacent tows 14 of CMC 10 gradually increase from the mid-plane of CMC 10 toward outer surface 28 of CMC 10. In another example, the smallest pore sizes (first zone 20) can be positioned at another location of CMC 10, such as at a point of thickness or a distal end of CMC 10, among other options. First average pore size 26A, second average pore size 26B, and third average pore size 26C can be controlled and/or varied throughout the thickness (z-direction) of CMC 10 by controlling and adjusting the weave pattern of interconnected tows 14. To achieve smaller pores 16, a finer weave pattern is used to interconnect tows 14. Likewise, to achieve larger pores 16, a larger weave pattern is used to interconnect tows 14. More specifically, each zone 20, 22, and 24 can have a different number of tows 14 per inch of the weaved ply 12. The number of tows 14 per inch can be described as the picks per inch, which is the number of tows 14 that extend along one inch of one axis of ply 12. As such, in some examples, first zone 20 can have approximately 18 to 22 picks per inch; second zone 22 can have approximately 14 to 18 ceramic picks per inch; and third zone 24 can have approximately 10-14 picks per inch. Therefore, the gradient microstructure of CMC 10 is achieved by controlling and adjusting the weave pattern of interconnected tows 14 to produce the desired sized pores 16 through the thickness of CMC 10.

The average pore size for each of first zone 20, second zone 22, and third zone 24 can be defined as the average distance between adjacent tows 14 within a zone, the average area of each pore 16 within a zone, and the average volume of each pore 16 within a zone. As such, in some examples, the average distance between adjacent tows 14 within first zone 20 can range from 50 micrometers to 400 micrometers; the average distance between adjacent tows 14 within second zone 22 can range from 400 micrometers to 800 micrometers; and the average distance between adjacent tows 14 within third zone 24 can range from 800 micrometers to 1600 micrometers. Likewise, the average area of each pore 16 within first zone 20 can range from 2,500 square micrometers to 160,000 square micrometers; the average area of each pore 16 within second zone 22 can range from 160,000 square micrometers to 640,000 square micrometers and the average area of each pore 16 within third zone 24 can range from 640,000 square micrometers to 2,560,000 square micrometers. In addition, the average volume of each pore 16 within first zone 20 can range from 715,000 cubic micrometers to 36,640,000 cubic microm eters; the average volume of each pore 16 within second zone 22 can range from 36,640,000 cubic micrometers to 122,240,000 cubic micrometers; and the average volume of each pore 16 within third zone 24 can range from 122,240, 000 cubic micrometers to 366,080,000 cubic micrometers.

CMC 10 with the gradient microstructure also includes a plurality of ceramic particles 18 positioned within pores 16 of CMC 10. More specifically, a plurality of first ceramic particles 18A are positioned within the plurality of first pores 16A of first zone 20; a plurality of second ceramic particles 18B are positioned within the plurality of second pores 16B of second zone 22; and a plurality of third ceramic particles 18C are positioned within the plurality of third pores 16C of third zone 24. First ceramic particles 18A, second ceramic particles 18B, and third ceramic particles 18C can be formed from silicon carbide, boron carbide, hafnium oxide, hafnium boride, aluminum oxide, ytterbium oxide, or zirconium boride, to name a few non-limiting examples. First ceramic particles 18A, second ceramic particles 18B, and third ceramic particles 18C can be a homogeneous or heterogenous mixture of generally spherical, elongate, or otherwise irregularly shaped particles (e.g., short ceramic fibers).

In addition, first ceramic particles 18A, second ceramic particles 18B, and third ceramic particles 18C can range in size from 10 micrometers to 100 micrometers, depending on the location of ceramic particles 18 within CMC 10. First ceramic particles 18A are positioned within first pores 16A, which are the smallest pores 16 within CMC 10. As such, first ceramic particles 18A are the smallest ceramic particles 18 within CMC 10. In some examples, each of the plurality of first ceramic particles 18A can range in size from 10 micrometers to 30 micrometers. Second ceramic particles 18B are positioned within second pores 16B, which are the second largest pores 16 within CMC 10. As such, second ceramic particles 18B are larger than first ceramic particles 18A and smaller than third ceramic particles 18C. In some examples, each of the plurality of second ceramic particles 18B can range in size from 31 micrometers to 75 micrometers. Third ceramic particles 18C are positioned within third pores 16C, which are the largest pores 16 within CMC 10. As such, third ceramic particles 18C are larger than first ceramic particles 18A and second ceramic particles 18B. In some examples, each of the plurality of third ceramic particles 18C can range in size from 76 micrometers to 100 micrometers.

In other examples, first ceramic particles 18A, second ceramic particles 18B, and third ceramic particles 18C can have a constant size, meaning each of first ceramic particles 18A, second ceramic particles 18B, and third ceramic particles 18C can be approximately the same size and shape. In such an example, the constant sized ceramic particles 18 can be applied to each of first pores 16A, second pores 16B, and third pores 16C to fill pores 16A, 16B, and 16C with the constant sized ceramic particles 18. Further, the loading level of ceramic particles 18 within each of pores 16A, 16B, and 16C can vary such that each pore 16A, 16B, and 16C may be filled to a different degree of fullness. For example, first pores 16A may be filled to a greater fullness level than second pores 16B, such that a greater percentage of first pore 16A is filled than second pore 16B. In addition, second pores 16B may be filled to a greater fullness level than third pores 16B, such that a greater percentage of second pore 16A is filled than third pore 16B. Densification of CMC 10 with varied loading levels of ceramic particles 18 for each of pores 16A, 16B, and 16C can result in a CMC 10 having improved mechanical and thermal properties. More specifically, in the particle enhanced preform of CMC 10, first average pore size 26A will be smaller than second average pore size 26B, and second average pore size 26B will be smaller than third average pore size 26C. The gradient microstructure of CMC 10 improves the mechanical and thermal properties of the resultant CMC 10.

In another example, CMC 10 can have a uniform weave architecture, as shown in FIG. 2A, and a variable/gradient porosity can still be achieved through various techniques. For example, a variable/gradient porosity of CMC 10 can be achieved through applying first ceramic particles 18A, second ceramic particles 18B, and third ceramic particles 18C of varying sizes to CMC 10. More specifically, first ceramic particles 18A can be the smallest sized particles and first ceramic particles 18A can be applied first to CMC 10. Second ceramic particles 18B can be particles larger than first ceramic particles 18A and second ceramic particles 18B can be applied to CMC 10 after first ceramic particles 18A. Third ceramic particles 18C can be particles larger than second ceramic particles 18B and third ceramic particles 18C can be applied to CMC 10 after second ceramic particles 18B. Applying the differing sized particles allows the smaller particles to reach central layers of CMC 10 while larger particles remain closer to a surface of CMC 10, creating a gradient microstructure for CMC 10 having a uniform weave architecture. In another example in which CMC 10 has a uniform weave architecture, constant sized particles with differing loading levels depending on the location within CMC 10 can be used to achieve a gradient microstructure, as described above.

Ceramic particles 18A, 18B, and 18C can be introduced or applied to CMC 10 such that there is an engineered difference in particle size, loading level, and/or composition through the thickness (z-direction) of CMC 10. Further, ceramic particle 18 distribution may have different variations in different regions/zones of CMC 10 to optimize the fibrous preform structure and the expected need for oxidation resistance. Therefore, ceramic particles 18A, 18B, and 18C can be strategically applied to different zones (first zone 20, second zone 22, third zone 24) of CMC 10 to achieve the desired mechanical and thermal properties of CMC 10. For example, ceramic particles 18 of a first composition (i.e. silicon carbide) can be applied to first zone 20 of CMC 10 and ceramic particles 18 of a second composition (i.e. boron carbide) can be applied to third zone 24 of CMC 10 to optimize CMC 10 for use in a gas turbine engine by altering the mechanical and thermal properties at the mid-plane and outer surface 28 of CMC 10. Likewise, the loading level of ceramic particles 18A, 18B, and 18C can be varied per region/zone of CMC 10 to optimize CMC 10 for use in a gas turbine engine. Altering the particle size, loading level, and/or composition through the thickness of CMC 10 will result in a reduction in pore size in each zone (first zone 20, second zone 22, and third zone 24) by a factor of at least two times compared to pores without the addition of particles. Further, altering the particle size, loading level, and/or composition through the thickness of CMC 10 will alter the mechanical and thermal properties of the resultant CMC 10 upon densification, discussed below.

Figure 2C:
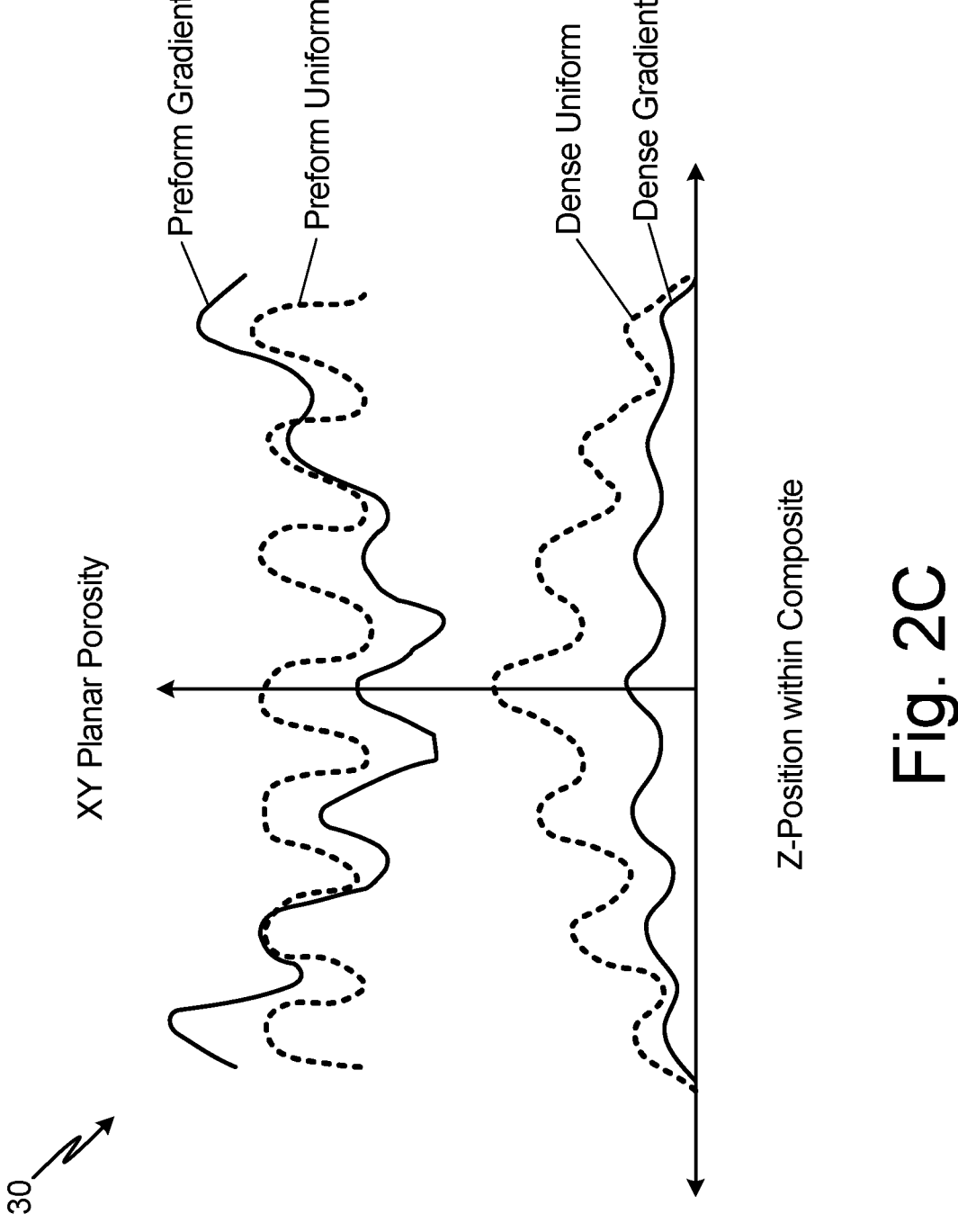
FIG. 2C is a graph illustrating the correlation of the microstructure and the planar porosity before and after densification of the ceramic matrix composite.

FIG. 2C is graph 30 illustrating the correlation of the microstructure and the planar porosity through the thickness of CMC 10 before and after densification of CMC 10. Graph 30 includes axes labelled "XY Planar Porosity" and "Z-position within Composite". This type of profile can be created through processing micro xCT data obtained on CMC preform and dense components. The micro xCT data can also confirm the presence of ceramic particles. The vertical axis (XY Planar Porosity) is the planar porosity within a plane of CMC 10. The horizontal axis (Z-position within Composite) is the vertical position within the thickness of CMC 10, with the mid-plane of CMC 10 being at the center position on graph 30 (refer to FIGS. 2A-2B). Graph 30 also illustrates Preform Uniform, Dense Uniform, Preform Gradient, and Dense Gradient. As shown in graph 30, the Preform Uniform line represent CMC 10 having a uniform microstructure (FIG. 2A) throughout the thickness of CMC 10 before densification of CMC 10. The Dense Uniform line represents CMC 10 with a uniform microstructure after densification of CMC 10. As shown by the Dense Uniform line, after densification of CMC 10, the mid-plane of the uniform microstructure CMC 10 has greater planar porosity at and near the mid-plane of CMC 10 and has lower planar porosity at and near outer surface 28 of CMC 10. As discussed, CMC 10 having a uniform microstructure can lead to canning off of the inner plies 12 of CMC 10, causing increased densification near the surface of CMC 10 and less densification near the central plies 12 of CMC 10. This can cause a reduction in mechanical and thermal properties in some scenarios.

As shown in graph 30, the Preform Gradient line represent CMC 10 having a gradient microstructure (FIG. 2B) throughout the thickness of CMC 10 before densification of CMC 10. More specifically, the Preform Gradient line represents CMC 10 having lower planar porosity after application of particles within the pores at and near the mid-plane of CMC 10 and higher planar porosity after application of particles within the pores at and near outer surface 28 of CMC 10. The Dense Gradient line represents CMC 10 with a gradient microstructure after densification of CMC 10. As shown by the Dense Gradient line, after densification of CMC 10, the mid-plane of the gradient microstructure CMC 10 has higher planar porosity at and near the mid-plane of CMC 10 and has lower planar porosity at and near outer surface 28 of CMC 10. Further, when comparing the Dense Uniform line and the Dense Gradient line, it is shown that the Dense Gradient line (CMC 10 with a gradient microstructure) is shallower in height. This means that CMC 10 with the gradient microstructure has a more uniform density throughout the thickness of CMC 10 after densification, as compared to the Dense Uniform line (CMC 10 with a uniform microstructure). Therefore, CMC 10 with a gradient microstructure before densification results in a more uniform density through the thickness of CMC 10 after densification, and thus increases the mechanical and thermal properties of CMC 10, as compared to CMC 10 with a uniform microstructure before densification.

The gradient microstructure of CMC 10 facilitates the uniform density after densification by having smaller pores 16 near the mid-plane (in some examples) of CMC 10 and larger pores 16 near outer surface 28 of CMC 10. During densification, the reactant vapors flow/travel through the network of porosity in CMC 10 to create the matrix material. The larger pores 16 near outer surface 28 allow the reactant vapors to easily travel through the network of pores 16 to the smaller pores 16 located near the mid-plane of CMC 10. In contrast, having smaller pores 16 near outer surface 28 of CMC 10 could result in densification at outer surface 28 of CMC 10 before the reactant vapors can reach the mid-plane of CMC 10, known as canning off. Canning off results in a high porosity/non-uniform density CMC 10 and reduced mechanical and thermal properties of CMC 10. It is highly desirable to have a low porosity/uniform density CMC 10 for gas turbine engine components. The low porosity/uniform density CMC 10 provides improved interlaminar properties such as interlaminar tensile strength (ILT), interlaminar shear strength (ILS), and increases thermal conductivity of CMC 10. As such, CMC 10 having a gradient microstructure and varying sizes of ceramic particles 18 within the gradient microstructure is advantageous because it results in an optimized pore structure and a more uniform densification of CMC 10, as compared to CMC 10 with a uniform microstructure.

FIG. 3A is a flow chart illustrating steps of method 100 for producing CMC 10. Method 100 for producing CMC 10 includes steps 102, 104, 106, 108, and 110, among other steps not specifically described. Step 102 includes providing a plurality of first ceramic fiber plies 12. Each of first ceramic fiber plies 12 includes a plurality of interconnected tows 14 and a plurality of first pores 16A positioned between adjacent tows 14. The plurality of first pores 16A within the plurality of first ceramic fiber plies 12 have a first average pore size 26A. In the embodiment described the plurality of first ceramic fiber plies are positioned at a mid-plane of CMC 10. In another embodiment, the plurality of first plies 12 can be positioned at another plane of CMC 10, such as at a point of thickness or a distal end of CMC 10, among other options. Step 104 includes applying a plurality of first ceramic particles 18A within the plurality of first pores 16A. The plurality of first ceramic particles 18A can be selectively applied to first pores 16A between individual tows 14 of ply 12 through methods such as spray applications and slurry infiltration through a bath or localized injection. In examples using methods such as spray applications and slurry infiltration through a bath, ceramic particles 18A can both fill first pores 16A between tows 14 and ceramic particles 18A can adhere to interior and exterior surfaces of tows 14 themselves.

Step 106 includes applying a plurality of second ceramic fiber plies 12 onto an outer surface of the plurality of first ceramic fiber plies 12. Each of the second ceramic fiber plies 12 comprises a plurality of interconnected tows 14 and a plurality of second pores 16B positioned between adjacent tows 14. The plurality of second pores 16B within the plurality of second ceramic fiber plies 12 have a second average pore size 26B. In the embodiment described the plurality of second ceramic fiber plies 12 are positioned adjacent the plurality of first ceramic fiber plies 12 in a direction closer to outer surface 28 of CMC 10. Step 108 includes applying a plurality of second ceramic particles 18B within the plurality of second pores 16B. The plurality of second ceramic particles 18B can be selectively applied to second pores 16A between individual tows 14 of ply 12 through methods such as spray applications and slurry infiltration through a bath or localized injection. In examples using methods such as spray applications and slurry infiltration through a bath, ceramic particles 18B can both fill second pores 16B between tows 14 and ceramic particles 18B can adhere to interior and exterior surfaces of tows 14 themselves. Further, the plurality of second ceramic particles 18B are larger than the plurality of first ceramic particles 18A.

Step 110 includes densifying CMC 10 to form the resultant CMC 10. Densifying the plurality of first ceramic fiber plies 12, the plurality of second ceramic fiber plies 12, the plurality of first ceramic particles 18A, and the plurality of second ceramic particles 18B can include one or more of a chemical vapor infiltration, chemical vapor deposition, melt infiltration, and polymer infiltration and pyrolysis process. As discussed, the plurality of first pores 16A within the plurality of first ceramic fiber plies 12 have a first average pore size 26A and the plurality of second pores 16B within the plurality of second ceramic fiber plies 12 have a second average pore size 26B. Further, the first average pore size 26A is smaller than the second average pore size 26B. As such, method 100 produces CMC 10 having a gradient microstructure in which the mid-plane plies 12 of CMC 10 have smaller pores 16 and the outer plies 12 of CMC 10 have larger pores 16, compared to the mid-plane pores 16. Although not specifically described method 100 for producing CMC 10 may include more or fewer steps than steps 102, 104, 106, 108, and 110.

For example, method 100 is described as having two layers (a plurality of first ceramic fiber plies 12 and a plurality of second ceramic fiber plies 12), it is to be understood that CMC 10 can have any number of layers and ceramic particles to produce the resultant CMC 10. As such, a further step could include applying a plurality of third ceramic fiber plies 12 onto an outer surface of the plurality of second ceramic fiber plies 12 before densifying CMC 10. Each of the third ceramic fiber plies 12 comprises a plurality of interconnected tows 14 and a plurality of third pores 16C positioned between adjacent tows 14. Another step could include applying a plurality of third ceramic particles 18C within the plurality of third pores 16C, with the plurality of third ceramic particles 18C being larger than the plurality of second ceramic particles 18B. As such, the method of applying a plurality of ceramic fiber layers and a plurality of ceramic particles to the layer could be repeated a plurality of times to achieve a CMC 10 with the desired mechanical and thermal properties. Method 100 produces CMC 10 having a gradient microstructure and varying sizes of ceramic particles 18 within the gradient microstructure. This is advantageous because it results in an optimized pore structure and a more uniform densification of CMC 10, as compared to CMC 10 with a uniform microstructure.

FIG. 3B is a flow chart illustrating steps of method 200 for producing CMC 10. Method 200 if substantially similar to method 100 of FIG. 3A, except ceramic particles 18 are pre-impregnated into the plurality of first ceramic fiber plies 12 and the plurality of second ceramic fiber plies 12. As such, the discussion of method 100 is to be understood to equally apply to method 200, except where noted. Method 200 for producing CMC 10 includes steps 202, 204, and 206, among other steps not specifically described. Step 202 includes providing a plurality of first prepreg ceramic fiber plies 12. Each of the first prepreg ceramic fiber plies 12 includes a plurality of interconnected tows 14, a plurality of first pores 16A positioned between each adjacent tow 14, and a plurality of first ceramic particles 18A positioned within the plurality of first pores 16A. The first prepreg ceramic fiber plies 12 already include the first ceramic particles 18A, and therefore step 104 of applying first ceramic particles 18A of method 100 is unnecessary for method 200.

Step 204 includes applying a plurality of second prepreg ceramic fiber plies 12 onto an outer surface of the plurality of first prepreg ceramic fiber plies 12. Each of the second prepreg ceramic fiber plies 12 includes a plurality of interconnected tows 14, a plurality of second pores 16B positioned between each adjacent tow 14, and a plurality of second ceramic particles 18B positioned within the plurality of second pores 16B. Further, the plurality of second ceramic particles 18B are larger than the plurality of first ceramic particles 18A. The second prepreg ceramic fiber plies 12 already include the second ceramic particles 18B, and therefore step 108 of applying second ceramic particles 18B of method 100 is unnecessary for method 200. Step 206 includes densifying the first prepreg ceramic fiber plies 12 and the second prepreg ceramic fiber plies 12 to form CMC 10. As described, method 200 is substantially similar to method 100, except ceramic particles 18 are pre-impregnated into the plurality of first ceramic fiber plies 12 and the plurality of second ceramic fiber plies 12. As such, the remaining discussion regarding method 100 is to be understood to equally apply to method 200, except for the first prepreg ceramic fiber plies 12 and the second prepreg ceramic fiber plies 12 to form CMC 10. Method 200 produces CMC 10 having a gradient microstructure and varying sizes of ceramic particles 18 within the gradient microstructure. This is advantageous because it results in an optimized pore structure and a more uniform densification of CMC 10, as compared to CMC 10 with a uniform microstructure.

Discussion of Possible Embodiments

The following are non-exclusive descriptions of possible embodiments of the present invention.

A method for producing a ceramic matrix composite component, the method comprising: providing a plurality of first ceramic fiber plies, wherein each of the first ceramic fiber plies comprises a plurality of first interconnected tows defining a plurality of first pores between adjacent of the plurality of first interconnected tows; applying a plurality of first ceramic particles within the plurality of first pores; applying a plurality of second ceramic fiber plies onto an outer surface of the plurality of first ceramic fiber plies, wherein each of the second ceramic fiber plies comprises a plurality of second interconnected tows defining a plurality of second pores between adjacent of the plurality of second interconnected tows; applying a plurality of second ceramic particles within the plurality of second pores; and densifying to form the ceramic matrix composite component; wherein before densification a planar porosity of the plurality of first ceramic fiber plies with the applied plurality of first ceramic particles is lower than a planar porosity of the plurality of second ceramic fiber plies with the applied plurality of second ceramic particles.

The method of the preceding paragraph can optionally include, additionally and/or alternatively, any one or more of the following features, configurations and/or additional components:

The plurality of first pores within the plurality of first ceramic fiber plies have a first average pore size; the plurality of second pores within the plurality of second ceramic fiber plies have a second average pore size; and the first average pore size is smaller than the second average pore size after applying the plurality of first ceramic particles and the plurality of second ceramic particles, respectively.

The first average pore size is the average planar area of each of the plurality of first pores, and the first average pore size ranges from 2,500 square micrometers to 160,000 square micrometers; and the second average pore size is the average planar area of each of the plurality of second pores, and the second average pore size ranges from 160,000 square micrometers to 640,000 square micrometers.

Each of the plurality of second ceramic particles are larger than each of the plurality of first ceramic particles.

Each of the plurality of first ceramic particles ranges in size from 10 micrometers to 30 micrometers; and each of the plurality of second ceramic particles ranges in size from 31 micrometers to 75 micrometers.

Each of the plurality of first ceramic particles and each of the plurality of second ceramic particles have a constant size; and a loading level of the plurality of first ceramic particles within the plurality of first pores is greater than a loading level of the plurality of second ceramic particles within the plurality of second pores.

The plurality of first ceramic fiber plies are positioned at a mid-plane of the ceramic matrix composite component; and the plurality of second ceramic fiber plies are positioned adjacent the plurality of first ceramic fiber plies in a direction closer to an outer surface of the ceramic matrix composite component.

Densifying the plurality of first ceramic fiber plies and the plurality of second ceramic fiber plies comprises one or more of a chemical vapor infiltration, chemical vapor deposition, melt infiltration, and polymer infiltration and pyrolysis process.

The plurality of first ceramic particles and the plurality of second ceramic particles are one or more of silicon carbide, boron carbide, hafnium oxide, hafnium boride, aluminum oxide, ytterbium oxide, and zirconium boride; and the plurality of first interconnected tows and the plurality of second interconnected tows are formed from silicon carbide.

Applying a plurality of third ceramic fiber plies onto an outer surface of the plurality of second ceramic fiber plies before densifying, wherein each of the third ceramic fiber plies comprises a plurality of third interconnected tows defining a plurality of third pores between adjacent of the plurality of third interconnected tows; and applying a plurality of third ceramic particles within the plurality of third pores, wherein before densification a planar porosity of the plurality of second ceramic fiber plies with the applied plurality of second ceramic particles is lower than a planar porosity of the plurality of third ceramic fiber plies with the applied plurality of third ceramic particles.

The following are further non-exclusive descriptions of possible embodiments of the present invention.

A ceramic matrix composite preform comprising: a plurality of ceramic fiber plies, wherein each of the ceramic fiber plies comprises a plurality of interconnected tows; a first zone comprising at least one of the ceramic fiber plies and a plurality of first pores positioned between adjacent tows within the first zone, wherein the plurality of first pores have a first average pore size; a second zone comprising at least one of the ceramic fiber plies and a plurality of second pores positioned between adjacent tows within the second zone, wherein the plurality of second pores have a second average pore size; a plurality of first ceramic particles positioned within the plurality of first pores of the first zone; and a plurality of second ceramic particles positioned within the plurality of second pores of the second zone; wherein a planar porosity of the first zone with the plurality of first ceramic particles positioned within the plurality of first pores is lower than a planar porosity of the second zone with the plurality of second ceramic particles positioned within the plurality of second pores.

The ceramic matrix composite preform of the preceding paragraph can optionally include, additionally and/or alternatively, any one or more of the following features, configurations and/or additional components:

The plurality of first pores within the first zone have a first average pore size; the plurality of second pores within the second zone have a second average pore size; and the first average pore size is smaller than the second average pore size after applying the plurality of first ceramic particles and the plurality of second ceramic particles, respectively.

The first average pore size is the average planar area of each of the plurality of first pores within the first zone, and the first average pore size ranges from 2,500 square micrometers to 160,000 square micrometers; and the second average pore size is the average planar area of each of the plurality of second pores within the second zone, and the second average pore size ranges from 160,000 square micrometers to 640,000 square micrometers.

Each of the plurality of second ceramic particles are larger than each of the plurality of first ceramic particles.

Each of the plurality of first ceramic particles ranges in size from 10 micrometers to 30 micrometers; and each of the plurality of second ceramic particles ranges in size from 31 micrometers to 75 micrometers.

Each of the plurality of first ceramic particles and each of the plurality of second ceramic particles have a constant size; and a loading level of the plurality of first ceramic particles within the plurality of first pores is greater than a loading level of the plurality of second ceramic particles within the plurality of second pores.

The plurality of first ceramic fiber plies are positioned at a mid-plane of the ceramic matrix composite component; and the plurality of second ceramic fiber plies are positioned adjacent the plurality of first ceramic fiber plies in a direction closer to an outer surface of the ceramic matrix composite component.

The ceramic matrix composite preform comprises a plurality of ceramic fiber plies that are stacked, debulked, and densified to form a ceramic matrix composite component.

Densifying the plurality of first ceramic fiber plies and the plurality of second ceramic fiber plies comprises one or more of a chemical vapor infiltration, chemical vapor deposition, melt infiltration, and polymer infiltration and pyrolysis process.

The plurality of first ceramic particles and the plurality of second ceramic particles are one or more of silicon carbide, boron carbide, hafnium oxide, hafnium boride, aluminum oxide, ytterbium oxide, and zirconium boride; and the plurality of first interconnected tows and the plurality of second interconnected tows are formed from silicon carbide.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A method for producing a ceramic matrix composite component, the method comprising:

providing a plurality of first ceramic fiber plies, wherein each of the first ceramic fiber plies comprises a plurality of first interconnected tows defining a plurality of first pores between adjacent of the plurality of first interconnected tows;

applying a plurality of first ceramic particles within the plurality of first pores during a first pre-impregnation operation;

applying a plurality of second ceramic fiber plies onto an outer surface of the plurality of first ceramic fiber plies, wherein each of the second ceramic fiber plies comprises a plurality of second interconnected tows defining a plurality of second pores between adjacent of the plurality of second interconnected tows;

applying a plurality of second ceramic particles within the plurality of second pores; and densifying to form the ceramic matrix composite component during a second pre-impregnation operation;

wherein each of the plurality of second ceramic particles are larger than each of the plurality of first ceramic particles;

wherein before densification a planar porosity of the plurality of first ceramic fiber plies with the applied plurality of first ceramic particles is lower than a planar porosity of the plurality of second ceramic fiber plies with the applied plurality of second ceramic particles;

wherein the planar porosity of first ceramic fiber plies is a percentage of pore area relative to a total area of the plurality of first ceramic fiber plies within a plane intersecting with the plurality of first ceramic fiber plies and the planar porosity of second ceramic fiber plies is a percentage of pore area relative to a total area of the plurality of second ceramic fiber plies measured within a plane intersecting with the plurality of second ceramic fiber plies.

2. The method of claim 1, wherein:

the plurality of first pores within the plurality of first ceramic fiber plies have a first average pore size;

the plurality of second pores within the plurality of second ceramic fiber plies have a second average pore size; and the first average pore size is smaller than the second average pore size after applying the plurality of first ceramic particles and the plurality of second ceramic particles, respectively.

3. The method of claim 2, wherein:

the first average pore size is the average planar area of each of the plurality of first pores, and the first average pore size ranges from 2,500 square micrometers to 160,000 square micrometers; and the second average pore size is the average planar area of each of the plurality of second pores, and the second average pore size ranges from 160,000 square micrometers to 640,000 square micrometers.

4. The method of claim 1, wherein:

each of the plurality of first ceramic particles ranges in size from 10 micrometers to 30 micrometers; and each of the plurality of second ceramic particles ranges in size from 31 micrometers to 75 micrometers.

5. The method of claim 1, wherein:

each of the plurality of first ceramic particles and each of the plurality of second ceramic particles have a constant size; and a loading level of the plurality of first ceramic particles within the plurality of first pores is greater than a loading level of the plurality of second ceramic particles within the plurality of second pores.

6. The method of claim 1, wherein:

the plurality of first ceramic fiber plies are positioned at a mid-plane of the ceramic matrix composite component; and the plurality of second ceramic fiber plies are positioned adjacent the plurality of first ceramic fiber plies in a direction closer to an outer surface of the ceramic matrix composite component.

7. The method of claim 1, wherein densifying the plurality of first ceramic fiber plies and the plurality of second ceramic fiber plies comprises one or more of a chemical vapor infiltration, chemical vapor deposition, melt infiltration, and polymer infiltration and pyrolysis process.

8. The method of claim 1, wherein:

the plurality of first ceramic particles and the plurality of second ceramic particles are one or more of silicon carbide, boron carbide, hafnium oxide, hafnium boride, aluminum oxide, ytterbium oxide, and zirconium boride; and the plurality of first interconnected tows and the plurality of second interconnected tows are formed from silicon carbide.

9. The method of claim 1 and further comprising:

applying a plurality of third ceramic fiber plies onto an outer surface of the plurality of second ceramic fiber plies before densifying, wherein each of the third ceramic fiber plies comprises a plurality of third interconnected tows defining a plurality of third pores between adjacent of the plurality of third interconnected tows; and applying a plurality of third ceramic particles within the plurality of third pores, wherein before densification a planar porosity of the plurality of second ceramic fiber plies with the applied plurality of second ceramic particles is lower than a planar porosity of the plurality of third ceramic fiber plies with the applied plurality of third ceramic particles.

10. A ceramic matrix composite preform comprising:

a plurality of first ceramic fiber plies and a plurality of second ceramic fiber plies, wherein each of the plurality of first ceramic fiber plies comprises a plurality of first interconnected tows and the plurality of second ceramic fiber plies comprises a plurality of second interconnected tows;

a first zone comprising at least one of the first ceramic fiber plies and a plurality of first pores positioned between adjacent tows within the first zone, wherein the plurality of first pores have a first average pore size and the plurality of first pores include a plurality of first ceramic particles positioned within the plurality of first pores during a first pre-impregnation operation; and a second zone comprising at least one of the second ceramic fiber plies and a plurality of second pores positioned between adjacent tows within the second zone, wherein the plurality of second pores have a second average pore size and the plurality of second pores include a plurality of second ceramic particles positioned within the plurality of second pores during a second pre-impregnation operation;

wherein each of the plurality of second ceramic particles are larger than each of the plurality of first ceramic particles;

wherein a planar porosity of the first zone with the plurality of first ceramic particles positioned within the plurality of first pores is lower than a planar porosity of the second zone with the plurality of second ceramic particles positioned within the plurality of second pores; wherein the planar porosity of the first zone is a percentage of pore area relative to a total area of the at least one of the first ceramic fiber plies in the first zone measured within a plane intersecting with the at least one of the first ceramic fiber plies in the first zone and the planar porosity of the second zone is a percentage of pore area relative to a total area of the at least one of the second ceramic fiber plies in the second zone intersecting with the at least one of the second ceramic fiber plies in the second zone.

11. The ceramic matrix composite preform of claim 10, wherein:

the plurality of first pores within the first zone have a first average pore size;

the plurality of second pores within the second zone have a second average pore size; and the first average pore size is smaller than the second average pore size after applying the plurality of first ceramic particles and the plurality of second ceramic particles, respectively.

12. The ceramic matrix composite preform of claim 11, wherein:

the first average pore size is the average planar area of each of the plurality of first pores within the first zone, and the first average pore size ranges from 2,500 square micrometers to 160,000 square micrometers; and the second average pore size is the average planar area of each of the plurality of second pores within the second zone, and the second average pore size ranges from 160,000 square micrometers to 640,000 square micrometers.

13. The ceramic matrix composite preform of claim 10, wherein:

each of the plurality of first ceramic particles ranges in size from 10 micrometers to 30 micrometers; and each of the plurality of second ceramic particles ranges in size from 31 micrometers to 75 micrometers.

14. The ceramic matrix composite preform of claim 10, wherein:

each of the plurality of first ceramic particles and each of the plurality of second ceramic particles have a constant size; and a loading level of the plurality of first ceramic particles within the plurality of first pores is greater than a loading level of the plurality of second ceramic particles within the plurality of second pores.

15. The ceramic matrix composite preform of claim 10, wherein:

the plurality of first ceramic fiber plies are positioned at a mid-plane of the ceramic matrix composite component; and the plurality of second ceramic fiber plies are positioned adjacent the plurality of first ceramic fiber plies in a direction closer to an outer surface of the ceramic matrix composite component.

16. The ceramic matrix composite preform of claim 10, wherein the ceramic matrix composite preform comprises a plurality of ceramic fiber plies that are stacked, debulked, and densified to form a ceramic matrix composite component.

17. The ceramic matrix composite component of claim 16, wherein densifying the plurality of first ceramic fiber plies and the plurality of second ceramic fiber plies comprises one or more of a chemical vapor infiltration, chemical vapor deposition, melt infiltration, and polymer infiltration and pyrolysis process.

18. The ceramic matrix composite preform of claim 10, wherein:

the plurality of first ceramic particles and the plurality of second ceramic particles are one or more of silicon carbide, boron carbide, hafnium oxide, hafnium boride, aluminum oxide, ytterbium oxide, and zirconium boride; and the plurality of first interconnected tows and the plurality of second interconnected tows are formed from silicon carbide.

* * * * *